Figure 1:
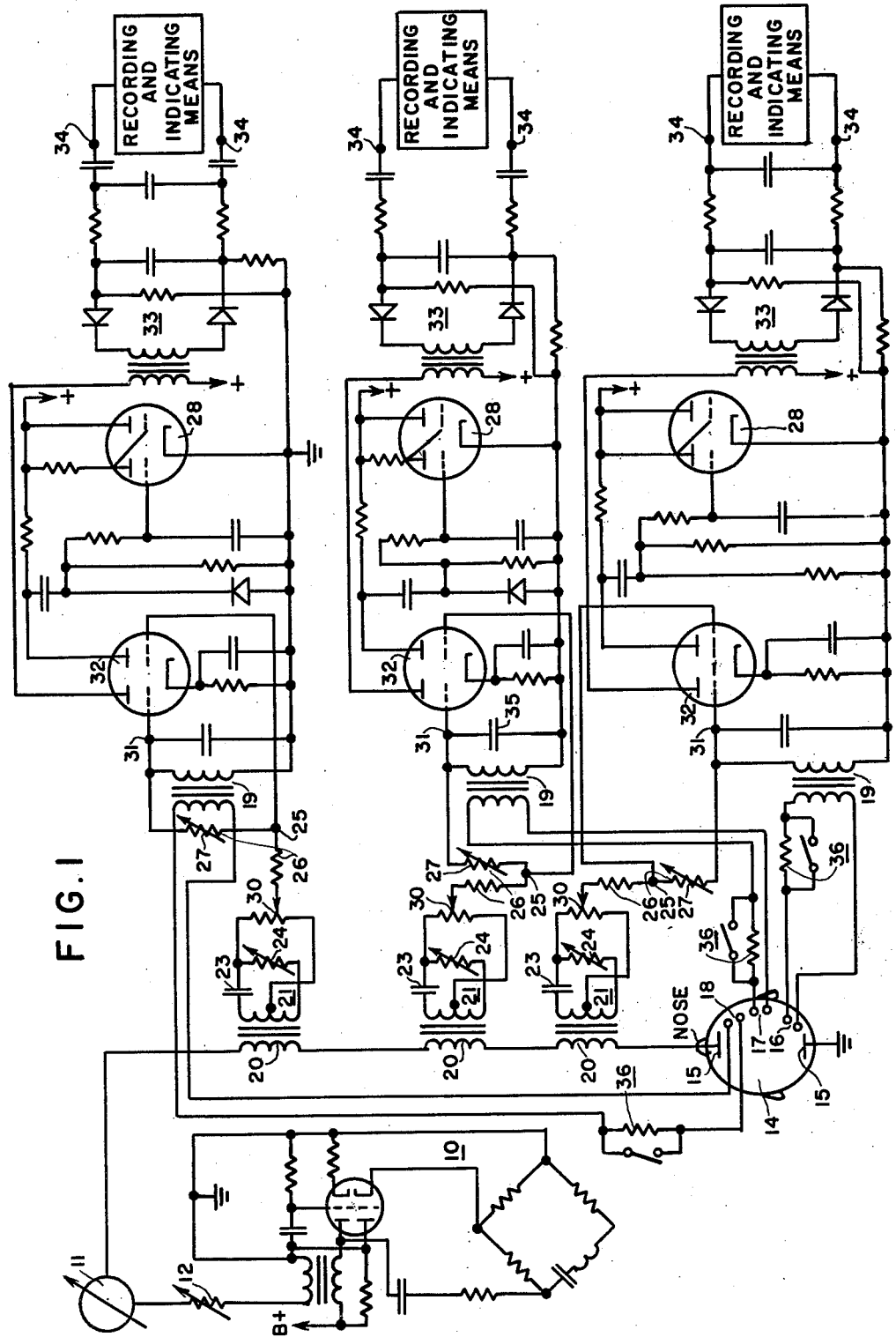

May 5, 1964   H. RODLER   3,131,689
APPARATUS FOR TESTING BLOOD-FLOW CONDITIONS
Filed Jan. 18, 1960   3 Sheets-Sheet 1

May 5, 1964 H. RODLER 3,131,689
APPARATUS FOR TESTING BLOOD-FLOW CONDITIONS
Filed Jan. 18, 1960 3 Sheets-Sheet 2

United States Patent Office 3,131,689
Patented May 5, 1964

3,131,689
APPARATUS FOR TESTING BLOOD-FLOW CONDITIONS
Hans Rodler, Graz-Neuhart, Austria, assignor to Fritz Schwarzer G.m.b.H., Munich-Pasing, Germany, a corporation of Germany
Filed Jan. 18, 1960, Ser. No. 2,928
Claims priority, application Austria Jan. 27, 1959
5 Claims. (Cl. 128—2.1)

My invention relates to means for determining blood-flow conditions in a living animal body by measuring changes in electric conductance or resistance in parts of the body as indicative of changes in blood-flow conditions, particularly in the head or brain. The term animal body is used herein in the broad sense of including the human body.

Known means of this type measure the electric current variations with a constant electric potential applied to the body by means of electrodes. These means have various short small parts of the body such as the head, to provide a plurality of electric measuring connections simultaneously. This is so because the voltages of several such known devices affect each other even if they are not directly intercoupled. Furthermore, several measuring circuits used simultaneously require a corresponding number of devices, thereby increasing the space requirements of the equipment. With such a simultaneous use of several devices, differences in electrode resistance may also cause correspondingly different measuring results which prevent an exact comparison. For example, variations in the seating of the electrodes may adversely affect the measuring result.

It is an object of my invention to provide blood-flow measuring devices which eliminate the above-mentioned disadvantages.

To this end, and in accordance with a feature of my invention, I apply to the animal body only one primary excitation circuit, and with a plurality of measuring electrodes I derive from the body electric potentials or voltages caused by the primary excitation circuit through the animal body, and I maintain the electrode circuits completely independent of the primary circuit and from each other, thus providing a number of mutually isolated tap voltages which are available for measuring, recording or comparison of the test results.

According to another feature of my invention, any spurious electric variations extraneous to the desired measuring performance proper and caused, for example, by defective electrode contact in the primary excitation circuit, are eliminated by deriving from the excitation circuit an auxiliary voltage which is proportional to the current in the excitation circuit and is introduced into the secondarily excited measuring circuits for compensating the effect of the spurious variations.

By virtue of their electric isolation, interference between the measuring circuits cannot occur because they receive voltage only from the animal body, thus operating in a passive manner. Consequently, when merely observing a proper routine in the application of the measuring electrodes to the animal body, measuring errors are eliminated and an accurate circumscription of any blood-flow disturbance locality can be effected by proceeding in a substantially topographic manner.

Figure 2:
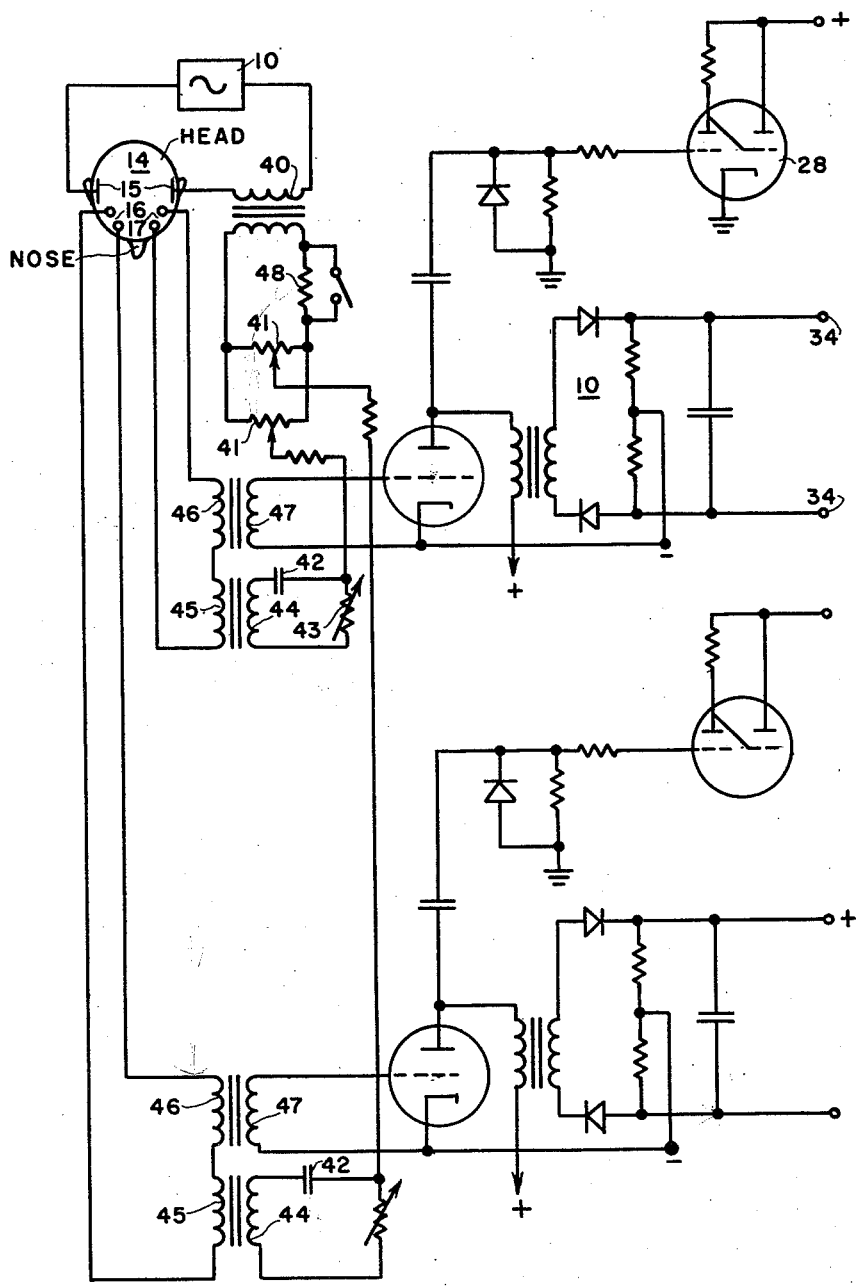
Figure 3:
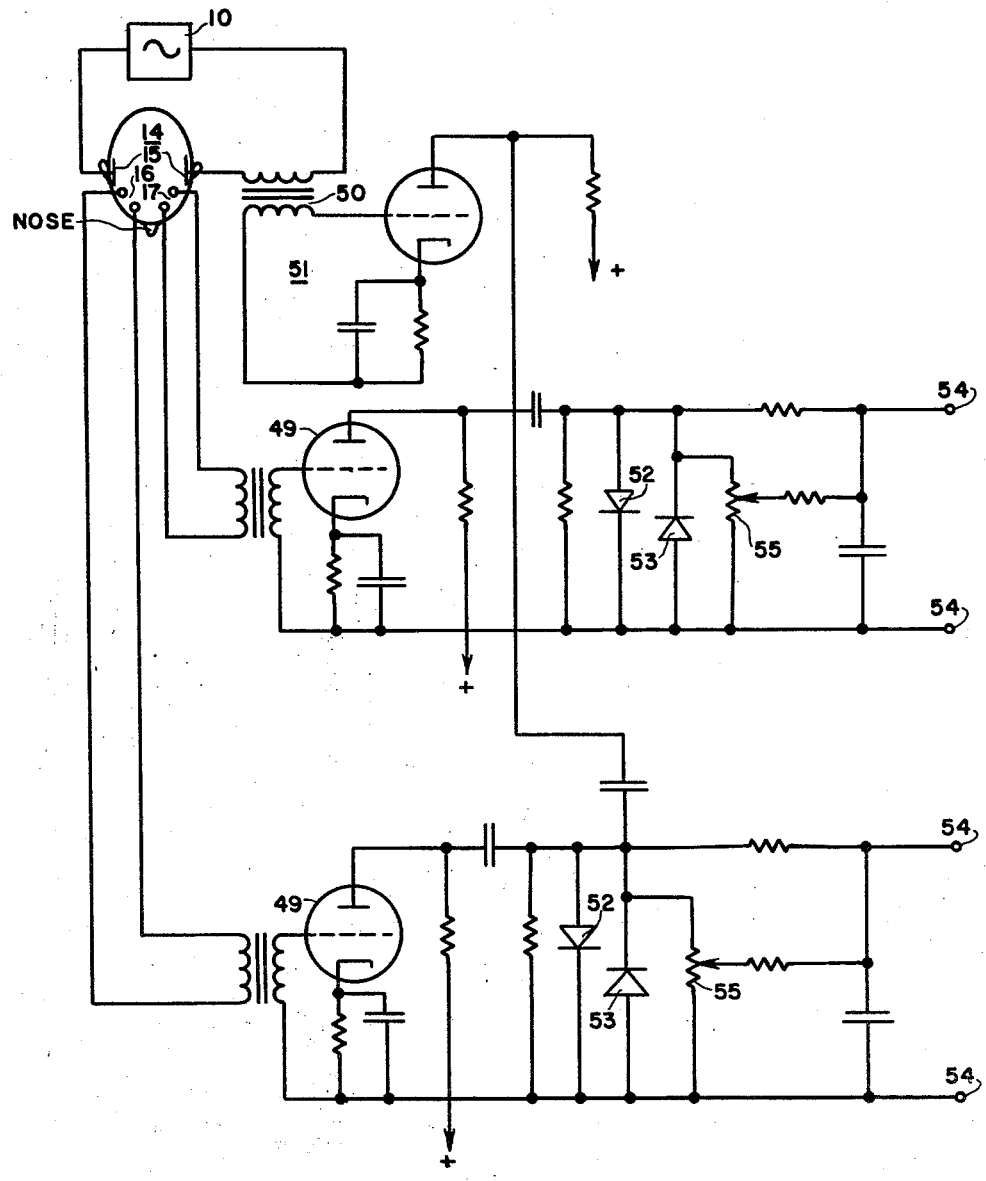

The invention will be further explained with reference to the embodiments of blood-flow testing apparatus according to the invention illustrated by way of example on the accompanying drawings in which FIGS. 1, 2 and 3 illustrate the electric circuit diagrams of three different apparatus resistors. According to FIG. 1 an alternating-voltage generator 10 serves as the source of primary excitation voltage. The frequency of the generator is preferably in the audio range and may amount to approximately 10 to 20 kilocycles per second. Connected with the generator 10 is an indicating instrument 11 and a dosage regulator 12 consisting essentially of an adjustable resistor. The generator 10 supplies to the physiological object or animal body 14 the necessary potential difference by means of two electrodes 15 which are in intimate contact with the body at mutually spaced locations. The voltage in the body between the two electrodes 15 is used for the excitation of a number of secondary measuring circuits of which three are illustrated. Each of these circuits is provided with a pair of probe electrodes 16, 17, 18 which are placed into intimate contact with the body at the desired locations selected from the diagnostic point of view. The two electrodes of each pair may be designed as individually applicable probes, or they may be combined, in insulated relation to each other, so as to form a single structure in which the spacing between the two probes has a given fixed or adjustable value. Three measuring circuits thus derive, from the body, three partial voltage drops. These are impressed upon three respective measuring networks through respective transformers 19 which isolate the secondary electrode circuits from each other. The three measuring networks are simultaneously supplied with respective auxiliary voltages which are derived from the primary excitation circuit by an isolating coupling. Each compensating voltage is impressed upon a coupling network 21, and the amount of compensating voltage actually utilized is adjusted by means of a rheostat 30. The tapped-off voltages are impressed upon each measuring network proper with the aid of a voltage divider 26 which comprises an adjustable resistor 27. The coupling with the primary excitation circuit is inductively effected by respective transformers 20. The coupling network 21 connected to the secondary winding of each transformer 20 comprises a capacitor 23 and an adjustable resistor 24, jointly acting as a phase regulator.

Each of the three measuring networks comprises a zero indicator attached to a circuit point 25 of a voltage divider having an adjustable resistor 26 and 27. The zero-indicator tube 28 proper is of the electron-ray type and permits reading of the zero adjustment for a proper phase setting at adjustable resistor 24 and a proper setting of the amount of compensating voltage at the rheostat 30. The adjustment of the adjustable resistor 27 in the voltage divider 26 then takes care of preserving at point 31 the same residual amplitude for all of the measuring networks. This residual amplitude is amplified in a tube 32 and subsequently demodulated in a demodulator network 33 at whose output terminals 34 a voltage is available for indicating or recording the measured compensated voltage drop.

Preferably, a capacitor 35 is connected parallel to the secondary winding of each transformer 19 for tuning the transformer secondary circuit to resonance. Serially connected in the passive probe-electrode circuits are respective resistors 36 each connected with a normally closed short-circuiting switch by means of which a calibrating indication can be obtained with respect to the electrode resistance in the probe-electrode circuits.

Thus as explained above, the three output voltages taken from the three pairs of output terminals 34 are compensated for any variations resulting from disturbances in the primary excitation circuit of the main electrodes 15. They thus permit a direct comparison of the measured voltage drops with each other either by observing the indicating instruments connected with the three pairs of output terminals 34, or by recording the respective output-voltages on recording instruments or on a single recording apparatus where the recorded voltage curves appear on a single recording surface. These individual voltages are dependent upon the blood-flow conditions as manifested by the electric conductance or resistance in the animal body at the respective localities of the pairs of probe electrodes. By shifting these electrodes to different locations, any irregularity or abrupt change in conductance and hence in blood-flow conditions can be determined, as may be desired for ascertaining the locality of a blood-flow disturbance.

According to FIG. 1 the current passing through the body 14 produces a voltage between the electrodes 15. Blood pulsations will vary the impedance of the body between the electrodes 15, thereby changing the voltage between the electrodes 15. Thus, the voltage between any intermediate points will also change with blood pulsation. The voltage outputs taken at points 16, 17 and 18 can indicate blood-flow conditions depending upon the frequency of blood pulsations or their comparative amplitudes. Such variation in pulsation amplitudes or frequencies will be sensed as changes in the frequency or amplitude of the respective voltages. In an extreme case where no voltage pulsations are sensed so that the indicating instrument records a straight line, it can be assumed that the portion of the network of veins located between the sensing electrodes is blocked.

That the voltage drops do indeed indicate blood-flow conditions is confirmed by the Holzer reference, column 1, lines 5 to 14. A more complete exposition of voltage indication for blood-flow conditions is given in the German language periodical "Wiener Medizinische Wochenschrift" dated 1953, No. 10, pages 181 to 183, in an article entitled "Rheographie."

The invention, of course, is amendable to various other embodiments with respect to the details of the electronic circuit connections and components. For example, FIG. 2 illustrates an apparatus of simplified design and simplified operation. A single transformer 40 is used for coupling the measuring networks with the primary excitation circuits to derive a compensating voltage therefrom. The secondary voltage of transformer 40 is applied through an adjustable control potentiometer 41 and through phase-correction components, comprising for example a capacitor 42 and an adjustable resistor 43, to the electrode circuits through respective transformer windings 44, 45, 46, 47. The amplitude difference desired for indicating or recording purposes is obtained by varying the compensating counter voltage with the aid of a resistor 48 shunted by a short-circuiting switch. All other details of the modified apparatus according to FIG. 2 correspond essentially to FIG. 1, and the apparatus is used in the same manner as explained above.

The embodiment illustrated in FIG. 3 departs, in principle, from those previously described, in that the useful signal voltage and the compensating voltage component are separately demodulated and, for the purpose of forming a difference voltage, are imposed upon each other only after demodulation. The two useful signals, corresponding to the respective voltage drops responded to by two pairs of probe electrodes 16 and 17, are amplified by respective amplifier tube 49. The compensating counter voltage derived inductively by a transformer 50 from the primary excitation circuit is amplified in an amplifier 51. The individual voltage components thus obtained are supplied to respective demodulators 52 and 53. As shown, the two demodulators are connected so that one demodulator furnishes at the output terminals 54 a voltage whose polarity is opposed to that furnished by the other demodulator. The regulator 55, consisting of a potentiometer network, thus permits adjusting the resultant voltage at output terminals 54 to the zero value. The particular advantage of the latter embodiment resides in the fact that it need not include any phase-correcting components because the two voltages are already demodulated before being differentially superimposed upon each other, so that the carrier frequency of the generator 10 is eliminated from the compensating operation.

It will be understood that the illustrated electron tubes may also be substituted, entirely or in part, by transistors or other semiconductor devices. The primary excitation current may be supplied from an available alternating-current utility line. In some cases, however, dry-cell or storage batteries may be used instead. This simplifies the apparatus because the rather complicated line-connection equipment is eliminated. Another advantage of operating with batteries is the fact that it permits simplifying the complete de-coupling of the individual circuits.

It will be apparent to those skilled in the art, upon studying this disclosure, that my invention permits of various other modifications and hence may be given embodiments other than particularly illustrated and described herein, without departing from the essential features of my invention and within the scope of the claims annexed hereto.

I claim:

1. Apparatus for testing blood-flow conditions in an animal body, comprising a primary excitation circuit having two main electrodes adapted for contacting the animal body at localities with a space between them and having a voltage source connected with said main electrodes for impressing a voltage upon the animal body between said main electrodes, electrical means for sensing the effect of blood flow upon the body conductance intermediate said main electrodes, said electrical means including a plurality of mutually insulated probe electrodes contactable with the animal body between said main electrodes and simultaneously with said electrodes for tapping respective voltage drops off the animal body, respective secondary circuits isolated from said primary excitation circuit and connected to pairs of said probe electrodes, and voltage measuring means connected to said secondary circuits for simultaneously measuring said respective voltage drops at said probe electrodes.

2. Apparatus for testing blood-flow conditions in an animal body, comprising a primary excitation circuit having two main electrodes adapted for contacting the body at localities with a space between them and having a voltage source connected with said main electrodes for impressing a voltage upon the animal body between said main electrodes electrical means for sensing the effect of blood flow upon the body conductance intermediate said main electrodes, said electrical means including a plurality of probe electrode pairs insulated from one another and from said main electrodes and contactable with the animal body and simultaneously with said electrodes for tapping respective voltage drops off the body, respective secondary circuits each connected across the two electrodes of each of said respective pairs to be energized by said respective voltage drops, compensating-voltage means coupled with said primary excitation circuit to derive therefrom a compensating voltage varying in accordance with voltage variations of said primary circuits, and measuring circuits of which each is connected with one of said respective secondary circuits and with said compensating voltage means for simultaneous differential response to one of said respective voltage drops and said compensating voltage, whereby the resultant voltages of said measuring circuits are comparatively indicative of the blood-flow conditions.

3. Apparatus for testing blood-flow conditions in an animal body, comprising a primary excitation circuit having two main electrodes adapted for contacting the animal body at localities having a space between them and having an alternating-current source connected with said main electrodes for impressing a voltage upon the animal body between said main electrodes, electrical means for sensing the effect of blood flow upon the body conductance intermediate said main electrodes, said electrical means including a plurality of mutually insulated probe electrodes contactable with the animal body between said main electrodes and simultaneously with said electrodes for simultaneously tapping respective voltage drops off the animal body, respective secondary circuits isolated from said primary excitation circuit each connected to pairs of said probe electrodes, compensating circuits coupled with the said primary excitation circuit for deriving therefrom a compensating voltage varying in accordance with voltage variations in said primary circuit, a plurality of measuring means to which said respective secondary circuits and said compensating circuits are connected in mutually differential voltage relation to respond to resultant compensated voltages indicative of blood-flow conditions, phase-shift means and voltage-amplitude adjusting means interposed between each of said measuring means on the one hand and one of said respective secondary and compensating circuits on the other hand to afford optimum adjustment of the effects of said voltage drop and of said compensating voltage upon said measuring means.

4. In apparatus according to claim 3, each of said measuring means comprising a zero indicator for indicating the in-phase adjustment of said voltage drop and said compensating voltage, and a potentiometer for adjusting a given measuring voltage at zero phase adjustment.

5. Apparatus according to claim 3, comprising transformer means which couple said compensating circuits with said primary excitation circuit, and respective transformers coupling said secondary circuits with said measuring means.

References Cited in the file of this patent

UNITED STATES PATENTS

| | | |
|---|---|---|
| 2,094,234 | Drain et al. | Sept. 28, 1937 |
| 2,184,511 | Bagno et al. | Dec. 26, 1939 |
| 2,661,734 | Holzer et al. | Dec. 8, 1953 |
| 2,871,445 | Carter | Jan. 27, 1959 |

FOREIGN PATENTS

| | | |
|---|---|---|
| 575,426 | Germany | Apr. 29, 1933 |